(12) United States Patent
Tinnakornsrisuphap et al.

(10) Patent No.: US 11,228,536 B2
(45) Date of Patent: Jan. 18, 2022

(54) USAGE OF QUIC SPIN BIT IN WIRELESS NETWORKS

(71) Applicant: QUALCOMM Incorporated, San Diego, CA (US)

(72) Inventors: Peerapol Tinnakornsrisuphap, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/743,237

(22) Filed: Jan. 15, 2020

(65) Prior Publication Data

US 2021/0218687 A1 Jul. 15, 2021

(51) Int. Cl.
*H04L 12/841* (2013.01)
*H04L 12/801* (2013.01)
*H04L 12/823* (2013.01)
*H04L 29/06* (2006.01)
*H04W 28/02* (2009.01)
*H04L 12/851* (2013.01)

(52) U.S. Cl.
CPC ............ *H04L 47/283* (2013.01); *H04L 47/12* (2013.01); *H04L 47/2441* (2013.01); *H04L 47/326* (2013.01); *H04L 69/164* (2013.01); *H04W 28/0268* (2013.01); *H04W 28/0273* (2013.01)

(58) Field of Classification Search
None
See application file for complete search history.

(56) References Cited

U.S. PATENT DOCUMENTS

| | | | |
|---|---|---|---|
| 2007/0165531 A1* | 7/2007 | Labrador | H04L 47/193 370/235 |
| 2020/0236043 A1* | 7/2020 | Sze | H04L 43/0882 |
| 2020/0267083 A1* | 8/2020 | Osuga | H04L 43/0876 |
| 2020/0267437 A1* | 8/2020 | Pantos | H04N 21/4621 |
| 2020/0336258 A1* | 10/2020 | Zhu | H04L 1/0076 |
| 2020/0413466 A1* | 12/2020 | Yu | H04W 76/16 |
| 2021/0006642 A1* | 1/2021 | He | H04L 43/0817 |

* cited by examiner

*Primary Examiner* — Alex Skripnikov
(74) *Attorney, Agent, or Firm* — The Marbury Law Group, PLLC

(57) ABSTRACT

Various aspects include methods for QUIC packet processing. Various embodiments may include a processor of a computing device determining a round trip time (RTT) for a QUIC flow based at least in part on a spin bit value of a QUIC packet of the QUIC flow, determining a bandwidth-delay (BW-delay) product for the QUIC flow based at least in part on the determined RTT for the QUIC flow, and controlling processing of QUIC packets for the QUIC flow based at least in part on the determined BW-delay product.

27 Claims, 14 Drawing Sheets

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Sapre | | | | 1 |
| Spare | | | QoS Flow Identifier 171 | | | | | 1 |
| Padding | | | | | | | | 0-3 |

USAGE OF QUIC SPIN BIT IN WIRELESS NETWORKS

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for QUIC packet processing using the Quick UDP Internet Connections (QUIC) protocol. In various aspects, the methods may be performed by a processor of a computing device. Various aspects may include determining a round trip time (RTT) for a QUIC data flow based at least in part on a spin bit value of a QUIC packet of the QUIC flow, determining a bandwidth-delay ("BW-delay") product for the QUIC flow based at least in part on the determined RTT for the QUIC flow, and controlling processing of QUIC packets for the QUIC flow based at least in part on the determined BW-delay product.

Some aspects may further include determining a buffer size for the QUIC flow based on the determined BW-delay product, and setting a size of a buffer for use in routing QUIC packets of the QUIC flow to the determined buffer size.

Some aspects may further include determining whether a buffer utilization of the QUIC flow exceeds a threshold percentage of the determined BW-delay product, and sending a congestion notification to a QUIC sender in response to determining that the buffer utilization of the QUIC flow exceeds the threshold percentage of the determined BW-delay product. Various aspects may further include applying random early detection (RED) procedures to the QUIC flow.

Some aspects may further include determining whether a buffer utilization of the QUIC flow exceeds a threshold percentage of the determined BW-delay product, and applying RED procedures to the QUIC flow in response to determining that the buffer utilization of the QUIC flow exceeds the threshold percentage of the determined BW-delay product.

Some aspects may further include determining whether a spin bit value of a QUIC packet is different than a flow spin bit value state, and determining the RTT for the QUIC flow as a flow timer value in response to determining that a spin bit value of a QUIC packet is different than a flow spin bit value state.

In some aspects, the computing device may be a computing device in a fifth generation (5G) network. Some aspects may further include determining the BW-delay product for the QUIC flow as a product of an over-the-air (OTA) bandwidth for the QUIC flow and the determined RTT for the QUIC flow. Some aspects may further include determining the BW-delay product for the QUIC flow as a product of Quality of Service (QoS) parameter for the QUIC flow and the determined RTT for the QUIC flow. In some aspects, the QoS parameter may be a guaranteed bit rate (GBR).

Some aspects may further include determining the BW-delay product for the QUIC flow as a product of a bandwidth estimate for the QUIC flow determined by the computing device and the determined RTT for the QUIC flow.

Further aspects may include an apparatus, such as a computing device for use in a data communication network, having a processing device configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include an apparatus, such as a computing device, having means for performing functions of any of the methods summarized above. Further aspects include a system on chip processing device for use in a computing device configured to perform one or more operations of any of the methods summarized above. Further aspects include a system in a package processing device that includes two systems on chip for use in a computing device and is configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
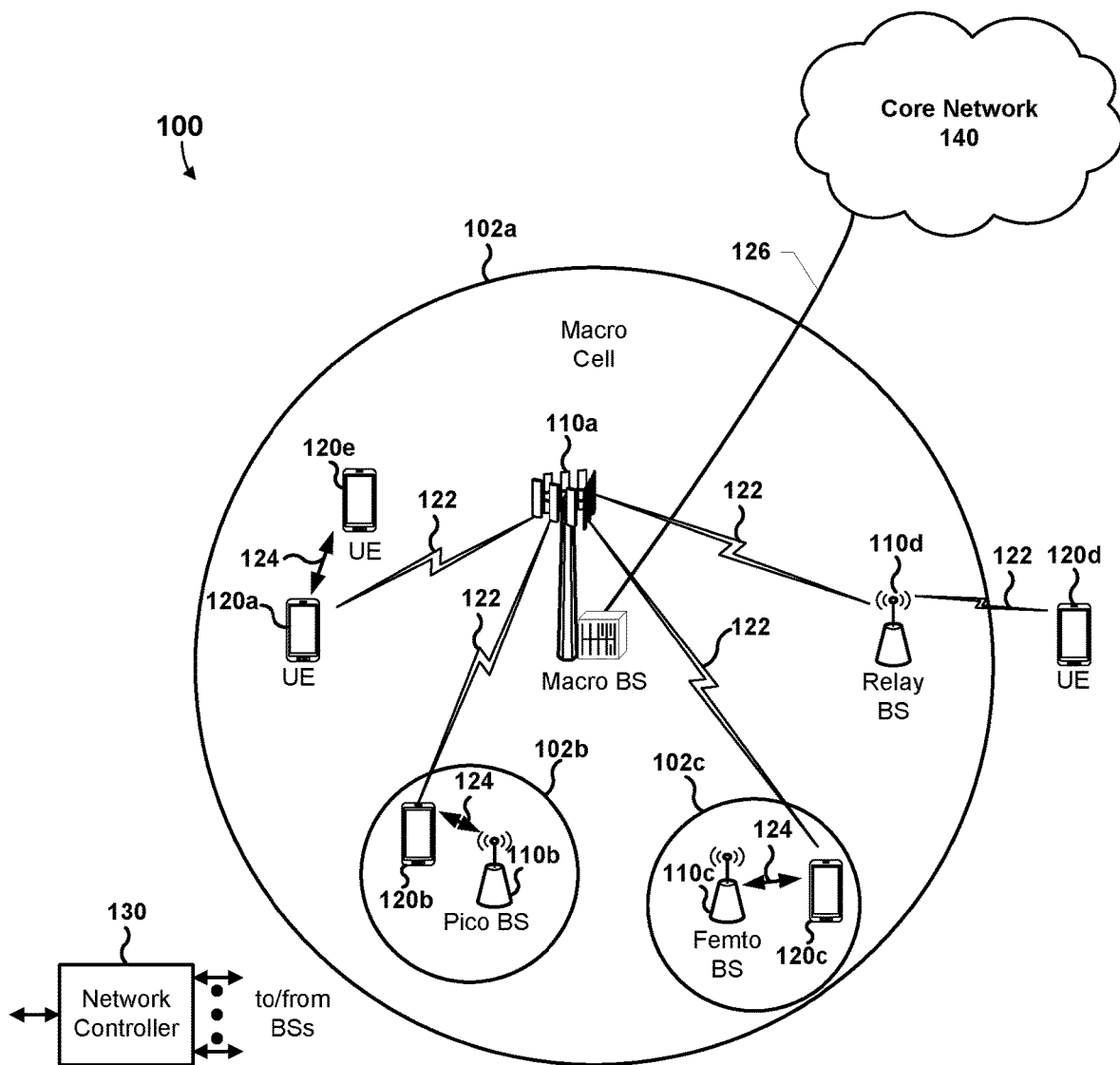
FIG. 1A is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide efficient mechanisms to enable individual computing devices in a communication network to determine packet round trip times (RRT) of data packets routed using the QUIC protocol by monitoring the "spin bit" in QUIC packets that are not encrypted. The RRT information determined in this manner may then be used for controlling various aspects of QUIC packet processing, such as setting a buffer size and/or implementing congestion control mechanisms.

The term "computing device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cellular communication network devices, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The Internet Engineering Task Force's (IETF's) QUIC transport protocol (or merely "QUIC") is intended to support User Datagram Protocol (UDP) based multiplexed and secure transport. The QUIC transport protocol functions to provide connection and stream multiplexing, transport layer security (TLS) using the TLS 1.3 protocol, loss recovery, in-order delivery within a stream, congestion control, and flow control. QUIC authenticates the headers and encrypts most of the data in a QUIC packet.

HyperText Transfer Protocol (HTTP)/3 (HTTP/3) operates as a thin layer on top of the QUIC layer and the UDP layer. Similar to HTTP/2's use of the Transmission Control Protocol (TCP) for transport packets via Internet Protocol (IP) transmissions, HTTP/3 uses the QUIC transport protocol for transport of packets via IP transmissions.

The 3rd Generation Partnership Project (3GPP) defines various protocols that support IP packet transmissions in wireless networks, such as third generation wireless mobile communication technologies (3G) (e.g., global system for mobile communications (GSM) evolution (EDGE) systems, etc.), fourth generation wireless mobile communication technologies (4G) (e.g., long term evolution (LTE) systems, LTE-Advanced systems, etc.), fifth generation wireless mobile communication technologies (5G) (5G New Radio (5GNR) systems, etc.), etc.

In various 3GPP protocols, IP packet transmissions over the air interface, such as transmissions to/from a user equipment (UE) computing device from/to a base station (e.g., cellular IoT (CIoT) base station (C-BS), a NodeB, an evolved NodeB (eNodeB), radio access network (RAN) access node, a radio network controller (RNC), a base station (BS), a macro cell, a macro node, a Home eNB (HeNB), a femto cell, a femto node, a pico node, a Next Generation NodeB (gNB), a next generation-eNodeB (ng-eNB), etc.), are handled by one or more "layer 2" sublayers, such as the packet data convergence protocol (PDCP) layer. The IP packets correspond to various different IP profiles, such as TCP/IP packets, QUIC/IP packets, etc. By supporting IP packet transmissions, the various 3GPP protocols may support HTTP. Specifically, the transmission of QUIC packets may support HTTP/3's use in 3GPP networks.

While most of a QUIC packet is encrypted, a single bit, referred to as a "spin bit," and the destination connection identifier of a QUIC packet are not encrypted. Thus, the spin bit and the destination connection identifier may be observable by middle devices (e.g., routers) in the routing path for QUIC packet (e.g., middle box devices in the QUIC flow path, such as cellular network or Wi-Fi access points).

The spin bit is bit in a header of a QUIC packet that may have a value of 0 or 1. The QUIC endpoints for a QUIC flow, e.g., the QUIC sender sending the QUIC packets and the QUIC receiver maintain spin bit values. The value of the spin bit is toggled (e.g., from 0 to 1 or from 1 to 0) after each round trip on the QUIC flow is confirmed. For example, QUIC packets may initially be generated by a QUIC sender with a spin bit value of zero such that the first QUIC packet may be sent with a spin bit value of 0. After the first QUIC packet with the spin bit value is transmitted on a QUIC flow, the subsequent QUIC packets may use the same spin bit value, e.g., a spin bit value of 0, until an acknowledgement message associated with the first QUIC packet is received. The acknowledgment message may indicate the first QUIC packet was received successfully by the QUIC receiver. In this manner, the acknowledgement message may be a confirmation that a round trip for the QUIC flow has occurred. In response to receiving the acknowledgement message, the QUIC sender may toggle the spin bit value to one and the next QUIC packet for the QUIC flow may be sent with the spin bit value of one. The QUIC sender may toggle the spin bit after each round trip is confirmed. As the spin bit toggles between 0 and 1 after each round trip is confirmed by the QUIC sender, a measured time between successive spin bit toggles observed on a QUIC flow may be an accurate measurement of round-trip time (RTT) for the QUIC flow.

Various embodiments include methods for QUIC packet processing that use round trip time (RTT) determined based at least in part on spin bit values of QUIC packets in QUIC flows to control the processing or routing of QUIC packets. Various embodiments may include determining a bandwidth-delay product (BW-delay product) using an RTT determined based on a spin bit value of a QUIC packet in a QUIC flow. In some embodiments, the BW-delay product may be determined by multiplying the bandwidth for the QUIC flow times the determined RTT for the QUIC flow. In some embodiments, the BW-delay product may be determined periodically, episodically, and/or continuously. In some embodiments, the BW-delay product may be averaged, filtered, and/or statistically processed over multiple observed round trips. Averaging, filtering, and/or statistically processing the BW-delay product over multiple observed round trips may avoid the BW-delay product value changing at every round trip. In some embodiments, BW-delay product may change over the duration of a connection supporting a QUIC flow. In some embodiments, a BW-delay product determined using an RTT determined based on a spin bit value of a QUIC packet in a QUIC flow may be used to determine buffer sizing for use in processing a QUIC flow. In some embodiments, a BW-delay product determined using an RTT determined based on a spin bit value of a QUIC packet in a QUIC flow may be used to enable early congestion notification.

In some embodiments, QUIC flows may be identified based on the specific source IP address, destination IP address, source port, destination port, and UDP port (e.g., 80, 8080, and 443) indicated for the QUIC flow. These 5-tuples, source IP address, destination IP address, source port, destination port, and UDP port, may distinguish one QUIC flow from another QUIC flow. After a QUIC connection handshake is complete, the connection identifier (Connection ID) may also be used to identify the QUIC flow. In some embodiments, the Connection ID may be indicated to a 3GPP network via signaling from a user equipment (UE) computing device or a server, such as a content delivery network (CDN) server, application server, mobile edge computing (MEC) server, etc.

Various embodiments may enable buffer sizing for QUIC flows based on RTT measurements. Computing devices routing QUIC flows may receive QUIC packets and store those QUIC packets for a period of time in a buffer prior to sending the QUIC packets on toward the QUIC receiver. Setting a buffer storing QUIC packets for routing too large may lead to a condition referred to as "bufferbloat" in which the QUIC flow may exhibit increased latency, jitter, and stalled recovery during packet loss. Setting a buffer storing QUIC packets for routing too small may lead to buffer underrun in which the link associated with the QUIC flow may be under-utilized. Various embodiments provide an efficient mechanism for appropriately sizing the buffer size for a QUIC flow by monitoring spin bits to determine the BW-delay product. For example, the buffer size may be set to the BW-delay product. Setting the buffer size to the BW-delay product may avoid bufferbloat and buffer underrun. In various embodiments, a buffer size for a QUIC flow may be set by allocating memory resources at the computing device routing QUIC flows for use as a buffer for that QUIC flow.

In various embodiments, the computing device processing QUIC flows may be a computing device of a cellular network, such as a 5G network. As specific examples, the computing device of the cellular network may be a User Plane Function (UPF), Packet Data Network Gateway (P-GW), gNB, ng-eNB, etc. In various embodiments, the computing device of the cellular network may observe the spin bit of QUIC packets in a QUIC flow to determine the RTT of the QUIC flow. In various embodiments, the computing device of the cellular network may determine the bandwidth of the QUIC flow. In some embodiments, the bandwidth of the QUIC flow may be an over-the-air (OTA) bandwidth, such as an estimate of available OTA bandwidth reported by a radio access network (RAN), such as 5G NR-RAN, etc.

In some embodiments, the bandwidth of the QUIC flow may be determined via QoS parameters of the QUIC flow, such as a guaranteed bit rate (GBR) bandwidth or any other type of bandwidth. The bandwidth, such as the GBR bandwidth or any other type of bandwidth, may be indicated in Quality of Service (QoS) parameters for the QUIC flow available to the computing device of the cellular network, such as QoS parameters indicated in overhead signaling.

Various embodiments provide an efficient mechanism for setting the buffer size of a computing device in a communication network. In various embodiments, the BW-delay product may be determined by multiplying the bandwidth for the QUIC flow times the RTT for the QUIC flow determined based on monitoring of spin bits in the QUIC packet headers. The buffer size of the computing device of the cellular network may then be set based on the BW-delay product. For example, the buffer size of the buffer for the QUIC flow at a UPF or P-GW may be set to the BW-delay product. As another example, the buffer size of the buffer at a base station of the RAN, such as a gNB, ng-eNB, etc., may be set to the BW-delay product. In some embodiments, size of the buffer used in the computing device in the cellular network may be set such that a sum of multiple buffers in the path of the QUIC flow (e.g., the size of the RAN buffer, such as the gNB buffer size, plus the UPF/P-GW buffer) is equal to the BW-delay product for the QUIC flow. In some embodiments, the size of the buffer used by the processing device of the computing device in the cellular network may be set such that most of the buffering may be at a UPF/P-GW buffer with minimal buffering at a RAN buffer, such as a gNB buffer. The size of the other buffers in the path of the QUIC flow may be reported by the other devices in the path over various interfaces, such as the NG interface in 5G, etc. In some embodiments, information may be exchanged between devices on the NG interface. In some embodiments, a RAN device, such as a gNB, may provide an estimated over-the-air bandwidth available to a 5G core network device, such as a UPF, on the uplink (UL) Protocol Data Unit (PDU) Session Information sent over the NG interface per the QoS Flow Identifier. For example, this information may be defined as shown in Appendix A of 3GPP Technical Specification (TS) 38.415 as a Future Extension Field.

In various embodiments, the computing device processing QUIC flows may estimate the bandwidth of the QUIC flow by monitoring spin bits in QUIC data packets. For example, a computing device processing QUIC flows may be a Wi-Fi access point that may estimate the bandwidth of the flow based on reporting from a scheduler, based on modem control signaling, based on past bandwidth estimates, and/or based on combinations thereof. In various embodiments, the BW-delay product may be determined by multiplying the bandwidth for the QUIC flow times the determined RTT for the QUIC flow. As an example, a Wi-Fi access point may observe the spin bit of a QUIC flow to determine the RTT and multiply that determined RTT times the bandwidth for the QUIC flow as determined by the Wi-Fi access point. The BW-delay product may be used to sizing a buffer of the Wi-Fi access point.

In some embodiments, RTT information determined based at least in part on QUIC spin bits for a QUIC flow may be used to trigger congestion control for the QUIC flow. In some embodiments, congestion control may be triggered prior to buffer overflow occurring. The triggering of congestion control for the QUIC flow may reduce or prevent buffer overflow by a computing device processing QUIC packets. In various embodiments, the trigger of congestions control may be in response to the computing device processing QUIC packets determining that a buffer utilization of the QUIC flow exceeds a threshold percentage of the determined BW-delay product. The threshold percentage may be setting at the computing device processing QUIC packets selected to avoid buffer overflow. The computing device processing QUIC packets may monitor the state of the buffer utilization to determine whether the buffer utilization exceeds the threshold percentage.

In some embodiments, congestion control may include sending a congestion notification to a QUIC sender to slow down the transmission of QUIC packets on the QUIC flow. For example, a field (e.g., an Explicit Congestion Notification (ECN) field) in a packet, such as an IP version 4 (IPv4) packet, IP version 6 (IPv6) packet, etc., may be set to a value indicating congestion is occurring, and the packet may be sent to the QUIC sender triggering the QUIC sender to reduce the transmission rate of QUIC packets on the QUIC flow. In this manner, the packet including such a field may operate as an explicit congestion notification. In some embodiments, congestion control may include employing Random Early Detection (RED) procedures on the QUIC flow. RED procedures may include dropping random packets or marking packets with ECN fields with a probability of dropping/marking a packet based on the buffer utilization.

In some embodiments, the triggering of congestion control based on RTT information may be implemented independent of buffer sizing based on RTT information (e.g., without buffer sizing based on RTT information being applied by the computing device processing QUIC packets). In some embodiments, the triggering of congestion control based on RTT information may be implemented in conjunction with buffer sizing based on RTT information (e.g., the buffer of the computing device processing QUIC packets may be based on RTT information and early congestion control for a QUIC flow may be applied based on RTT information).

Thus, various embodiments provide efficient mechanisms for increasing the efficiency of data communications using the QUIC protocol by monitoring spin bits in QUIC packets to estimate packet round trip times, using this RTT information to determine or estimate the BW-delay product for the QUIC flow, and using the BW-delay product to set a packet buffer at an appropriate size that avoids both buffer underflow and bufferbloat. Monitoring spin bits can be performed at any computing device in a communication network, and thus various embodiments may be implemented by individual computing devices, thereby eliminating a need for centralized setting of buffer sizes in a QUIC flow. Also, some embodiments provide efficient mechanisms for implementing congestion controls based on RRT information determined based monitoring spin bits in QUIC packets.

Various examples are discussed herein with reference to wireless communications and wireless computing devices to better illustrate various aspects of various embodiments. However, the discussions of wireless communications and wireless computing devices are merely examples of types of apparatus that may implement various embodiments, and are not intended to limit the scope of the disclosure or claims. Other types of apparatus, such as wired computing devices, and/or other types of communications, such as wired communications, may be substituted for the wireless communications and wireless devices in the various examples.

FIG. 1A illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (also referred to as user equipment (UE) computing devices) (illustrated as wireless device 120a-120e in FIG. 1A). The communications system 100 may also include a number of base stations (illustrated as the BS 110a, the BS 110b, the BS 110c, and the BS 110d) and other network entities. A base station is an entity that communicates with computing devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), a next generation eNB (ng-eNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", "ng-eNB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The computing device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other computing devices. In the example illustrated in FIG. 1A, a relay station 110d may communicate with macro the base station 110a and the computing device 120d in order to facilitate communication between the base station 110a and the computing device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The computing devices (UE computing devices) 120a, 120b, 120c may be dispersed throughout communications system 100, and each computing device may be stationary or mobile. A computing device also may be referred to as an access terminal, a UE, a terminal, a mobile station, a subscriber unit, a station, etc.

A macro base station 110a may communicate with the communication network 140 over a wired or wireless communication link 126. The computing devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE). For example, the base station 110a-110d may be a Wi-Fi access point.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per computing device. Multi-layer transmissions with up to 2 streams per computing device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A computing device 120a-e may be included inside a housing that houses components of the computing device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the computing device 120a and the computing device 120e) may communicate directly using one or more sidelink channels 124 (for example, without using a base station 110a-110d as an intermediary to communicate with one another). For example, the computing devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the computing device 120a-e may perform scheduling operations, resource selection operations, as well as other operations described elsewhere herein as being performed by the base station 110a.

Figure 1B:
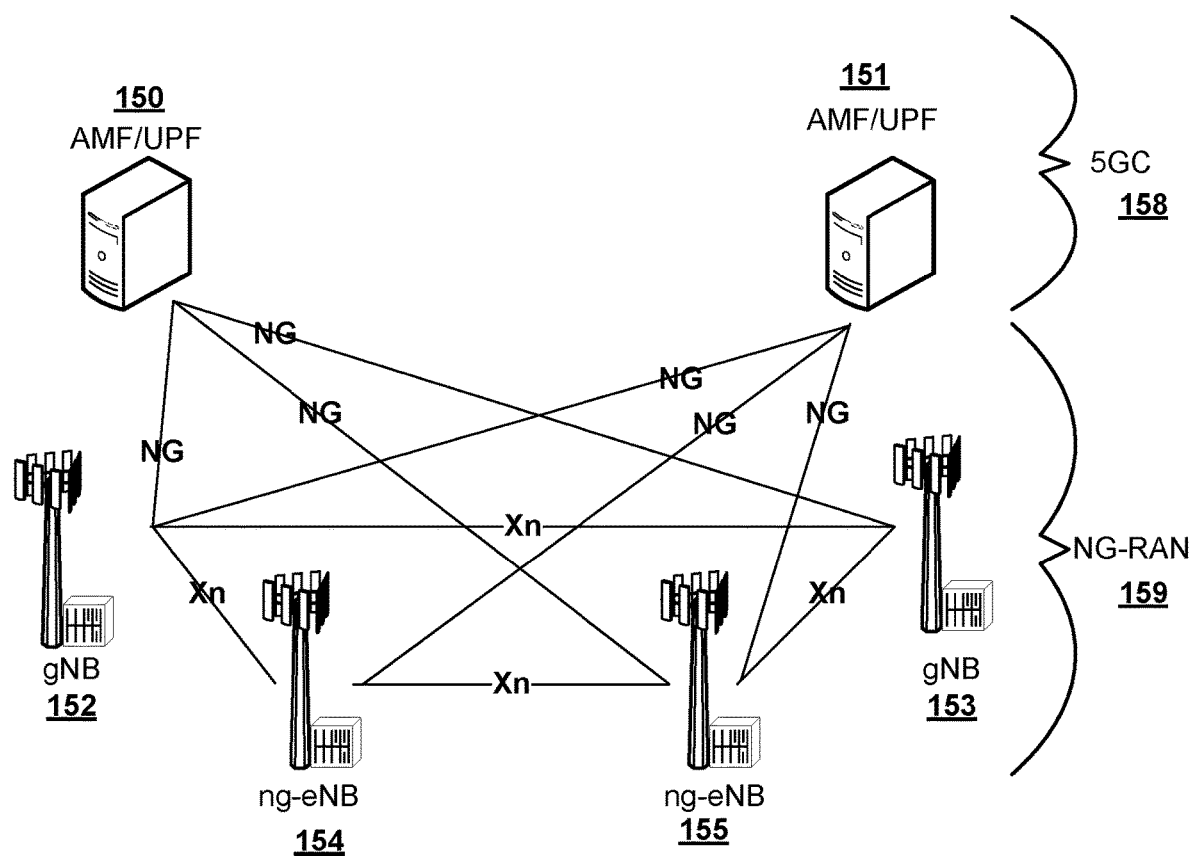
FIG. 1B is a system block diagram conceptually illustrating example connections in an example communications system.

FIG. 1B illustrates example connections between radio access network (RAN) elements, such as computing devices of a Next Generation (NG)-RAN 159, and core network elements, such as computing devices of a 5G core (5GC) network 158. With reference to FIGS. 1A and 1B, the NG-RAN 159 may include various base stations (e.g., base stations 110a-110d), such as gNB 152, ng-eNB 154, ng-eNB 155, and gNB 153. The 5GC 158 (e.g., core network 140) may include various computing devices providing core network functions 150, 151, such as Access Management Functions (AMF), UPFs, P-GWs, etc. The gNB 152, ng-eNB 154, ng-eNB 155, and gNB 153, and computing device providing core network functions 150, 151 may each be configured to route QUIC packets. Additionally, the gNB 152, ng-eNB 154, ng-eNB 155, and gNB 153, and computing device providing core network functions 150, 151 may exchange information with one another, such as bandwidth estimates (e.g., OTA bandwidth estimates, GBR bandwidths, etc.) via one or more interfaces, such as NG interfaces between RAN elements and 5GC elements and Xn interfaces between RAN elements.

Figure 1C:
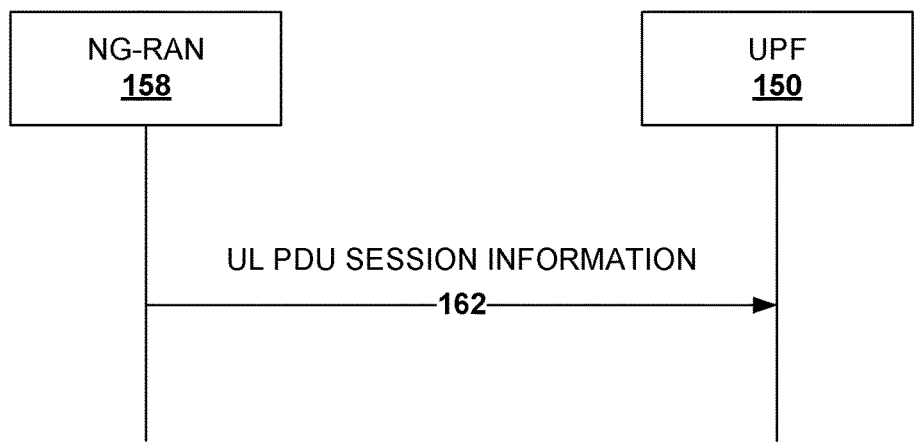
FIG. 1C is a call-flow diagram illustrating example of an uplink (UL) protocol data unit (PDU) session information exchange in an example communications system.

FIG. 1C illustrates an example UL PDU session information exchange between the NG-RAN 158 and a UPF that may be the computing device providing core network functions 150. With reference to FIGS. 1A-1C, an element of the NG-RAN 158, such as a gNB 152, an ng-eNB 154, an ng-eNB 155, and/or a gNB 153, may send UL PDU session information 162 to the computing device providing core network functions 150 (e.g., the UPF) via the NG interface. For example, the element of the NG-RAN 158 (e.g., the gNB) may provide an estimated over-the-air bandwidth available to the computing device providing core network functions 150 (e.g., the UPF) on the UL PDU Session Information 162 sent over the NG interface per the QoS Flow Identifier. For example, this information may be defined as shown in Appendix A of 3GPP TS 38.415 as Future Extension Field.

Figure 1D:
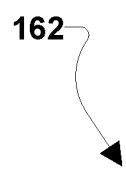
FIG. 1D illustrates an example format of PDU session information.

FIG. 1D illustrates an example format of PDU session information 162. With reference to FIGS. 1A-1D, the PDU session information may include a QoS Flow Identifier 171. As an example, an estimated over-the-air bandwidth from a RAN (e.g., NG-RAN 158) may be provide on the UL PDU Session Information 162 sent over the NG interface per the QoS Flow Identifier 171.

Figure 2:
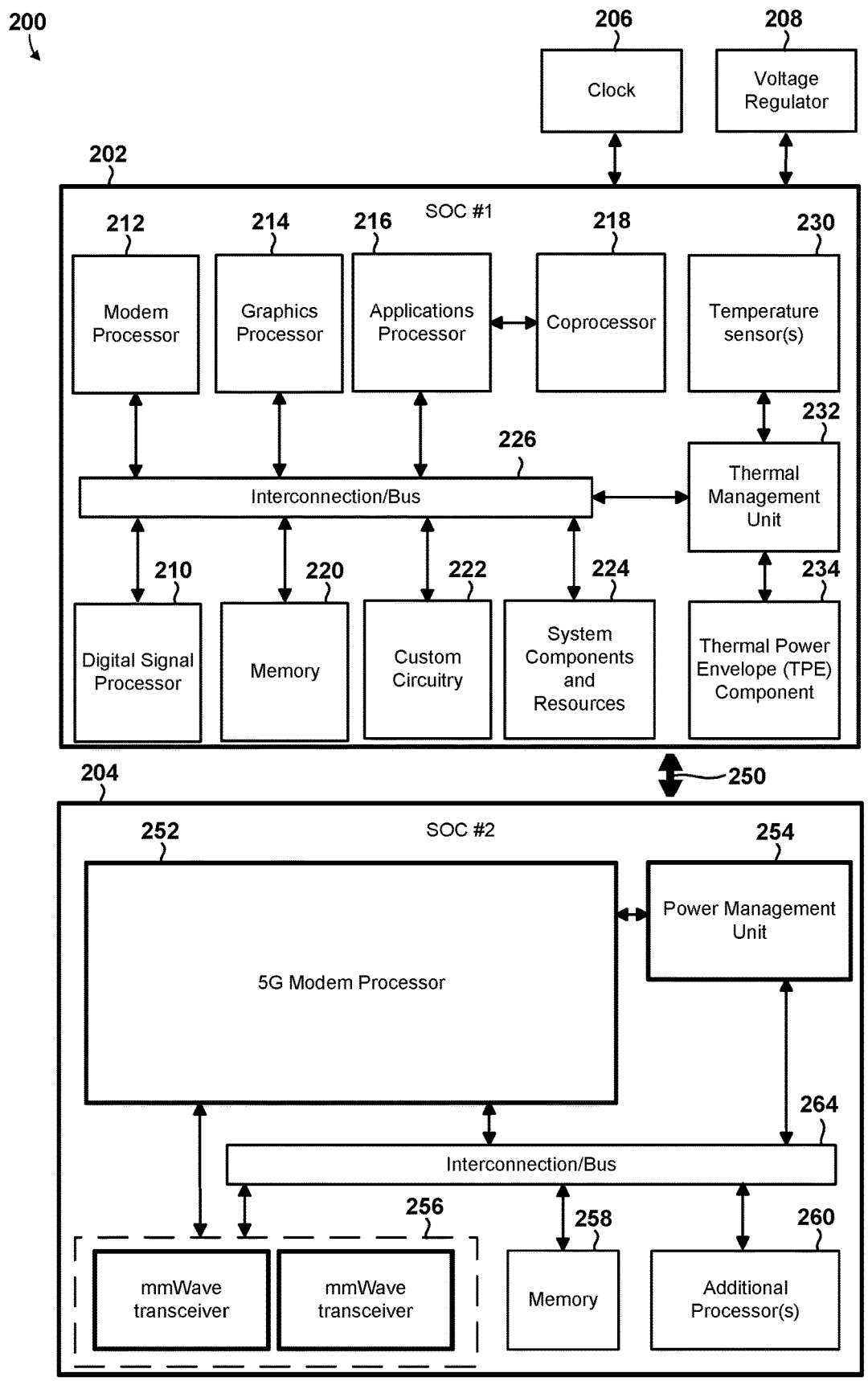
FIG. 2 is a component block diagram illustrating a computing system that may be configured to implement QUIC packet routing in accordance with various embodiments.

Various embodiments may be implemented on a number of single processor and multiprocessor processing devices, including a system-on-chip (SOC) or system in a package (SIP), which may be use in a variety of computing devices. FIG. 2 illustrates an example processing device or SIP 200 architecture that may implement various embodiments and be used in computing devices (UE computing devices) implementing the various embodiments.

With reference to FIGS. 1A-2, the illustrated example SIP 200 includes a two SOCs 202, 204, a clock 206, and a voltage regulator 208. In some embodiments, the first SOC 202 operate as central processing unit (CPU) of the computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHzmmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
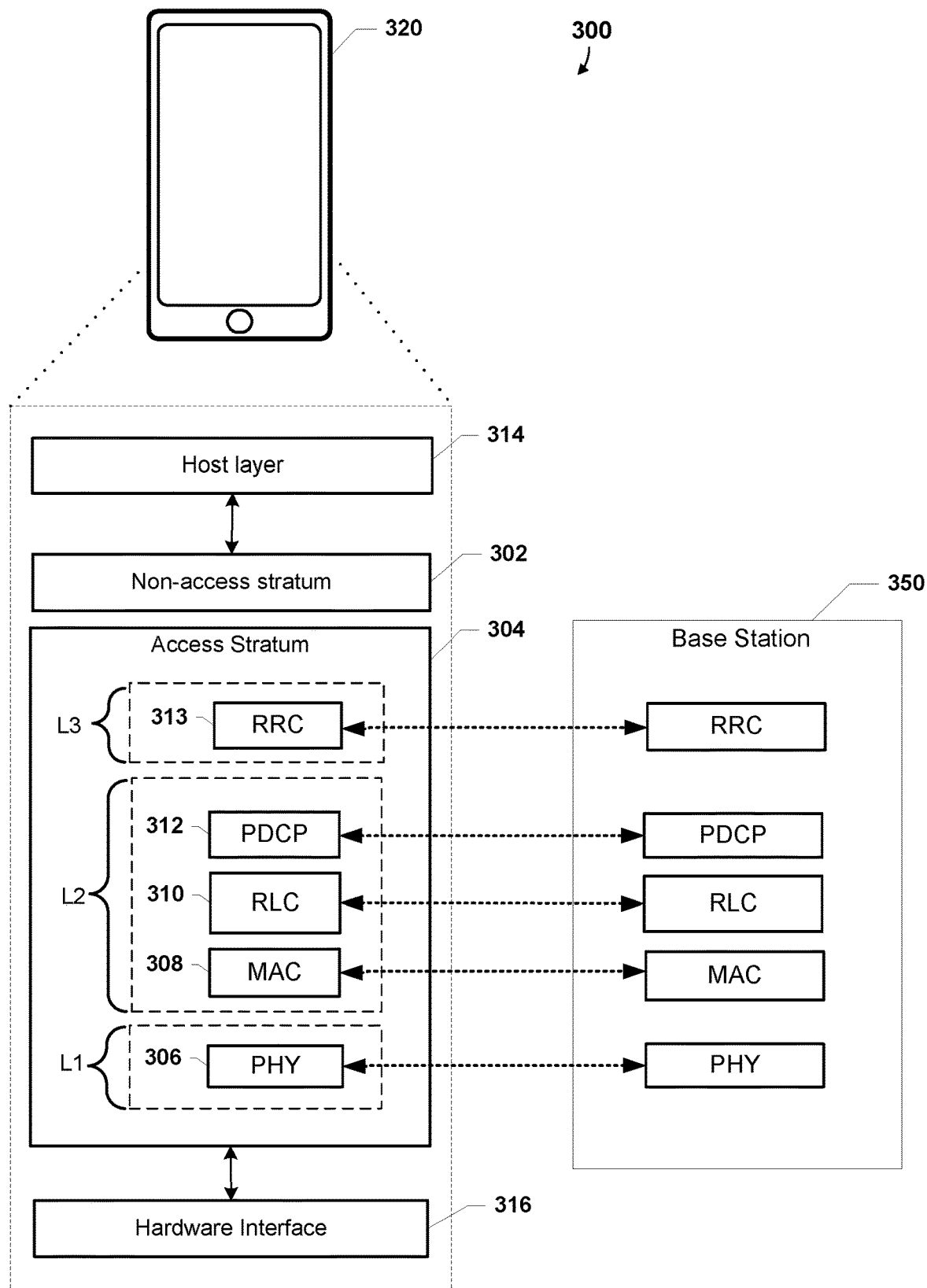
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a-110d, gNB 152, ng-eNB 154, ng-eNB 155, and gNB 153) and a computing device (UE computing device) 320 (e.g., the computing device 120a-120e, 200). With reference to FIGS. 1A-3, the computing device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the computing device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the computing device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression. In various embodiments, the PDCP sublayer 312 may encode QUIC/UDP/IP packets for transmission via lower layers and/or decode QUIC/UDP/IP packets received from low layers and destined for higher layers.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the computing device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
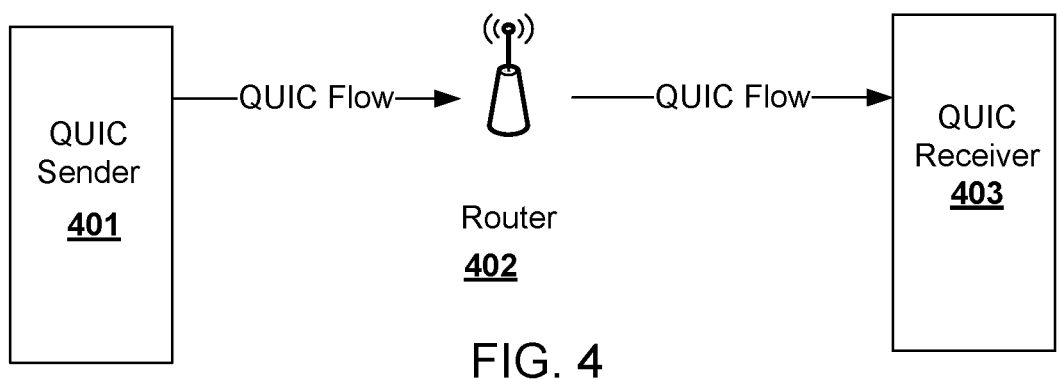
FIG. 4 is a system block diagram conceptually illustrating QUIC packet routing between a QUIC sender computing device and a QUIC receiver computing device by a router.

FIG. 4 illustrates QUIC packet routing between a QUIC sender computing device 401 and a QUIC receiver computing device 403 via a router 402. With reference to FIGS. 1A-4, the QUIC sender computing device 401 may be a computing device outputting QUIC packets for a QUIC flow, such as a UE computing device (e.g., the computing device 120a-120e, 200, 320). The QUIC receiver computing device 403 may be a computing device that is the end destination for QUIC packets of the QUIC flow, such as a server, such as a CDN server, application server, MEC server, etc. In various embodiments, QUIC flows may be identified based on the specific source IP address, destination IP address, source port, destination port, and UDP port (e.g., 80, 8080, and 443) indicated for the QUIC flow. These 5-tuples, source IP address, destination IP address, source port, destination port, and UDP port, may distinguish one QUIC flow from another QUIC flow. After a QUIC connection handshake is complete, the connection identifier (Connection ID) may also be used to identity the QUIC flow.

A router 402 may be any computing device in the pathway between the QUIC sender computing device 401 and the QUIC receiver computing device 403 that receives QUIC packets of the QUIC flow and forwards those QUIC packets towards the QUIC receiver computing device 403. While illustrated as including a single router 402 in the path in FIG. 4, more than one router 402 may be in the pathway for QUIC packets to travel from the QUIC sender computing device 401 to the QUIC receiver computing device 403. As examples, a router 402 may be any one or more of base station 110a-d, 350, gNB 152, ng-eNB 154, ng-eNB 155, gNB 153, and computing devices 150, 151 (e.g., UPF, AMF, P-GW, etc.). While various examples are described herein with QUIC packets moving along QUIC flows in the UL direction, such as where the QUIC sender is a UE computing device and the QUIC receiver is a server (e.g., a CDN server, application server, MEC server, etc.), these are merely examples of a QUIC flow direction and QUIC packets may move along QUIC flows in the downlink (DL) direction, such as where the QUIC sender is a server (e.g., a CDN server, application server, MEC server, etc.) and the QUIC receiver is a UE computing device.

Figure 5:
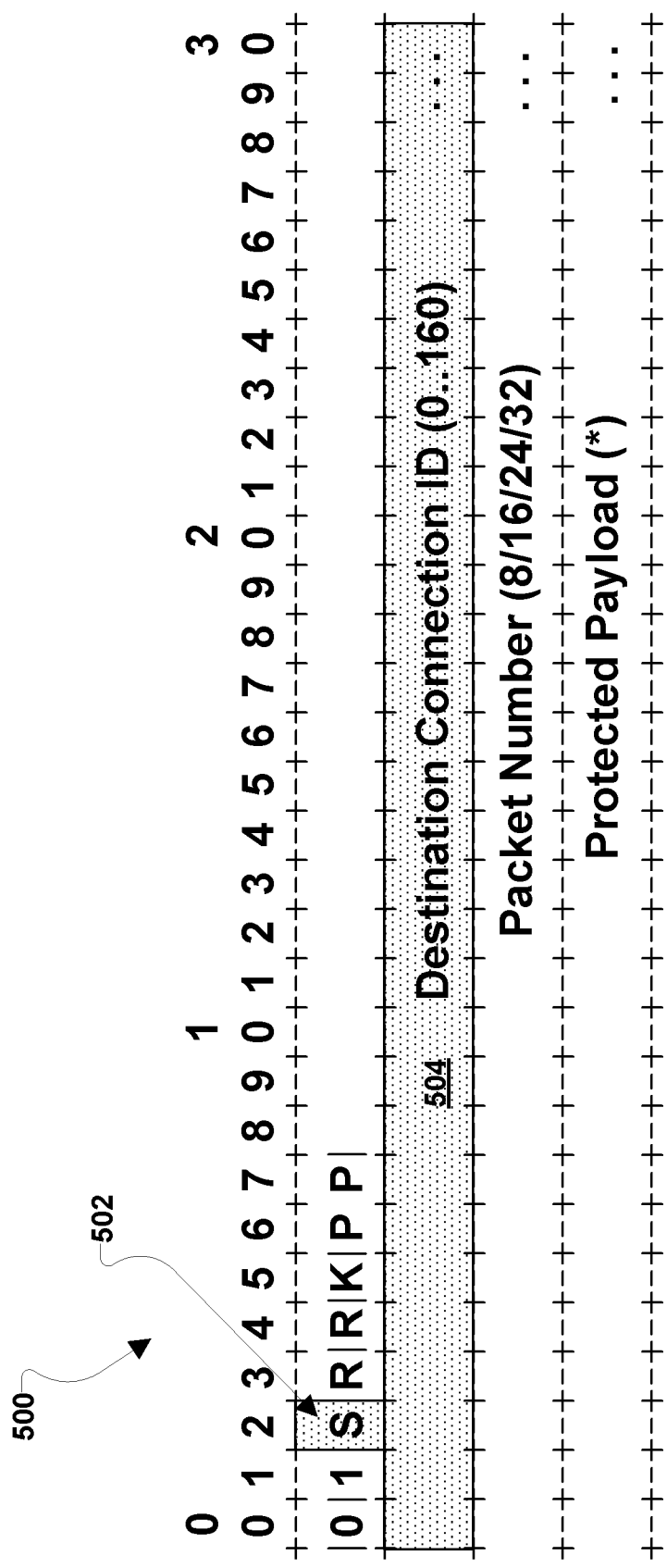
FIG. 5 illustrates elements of an example QUIC packet according to an embodiment.

FIG. 5 illustrates elements of an example QUIC packet 500 according to an embodiment. With reference to FIGS. 1A-5, the QUIC packet may include various elements, including specifically a spin bit 502 and a destination connection ID 504. In some implementations, only the spin bit 502 and the destination connection ID 504 may be unencrypted. The spin bit 502 may be bit in a header of a QUIC packet that may have a value of 0 or 1. The QUIC endpoints for a QUIC flow, e.g., the QUIC sender computing device 401 sending the QUIC packets and the QUIC receiver computing device 403 maintain spin bit values. The value of the spin bit 502 may be toggled (e.g., from 0 to 1 or from 1 to 0) after each round trip on the QUIC flow is confirmed.

Figure 6:
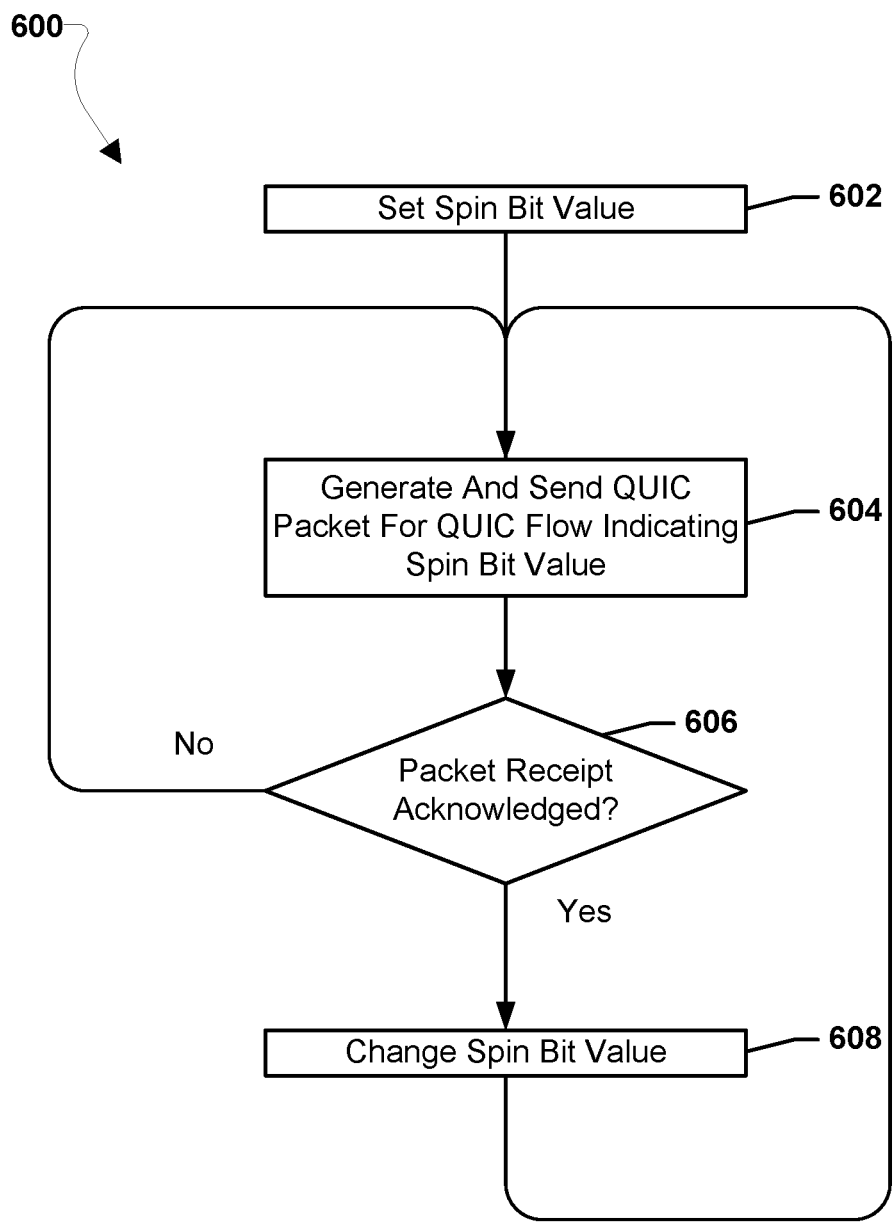
FIG. 6 is a process flow diagram illustrates a method for generating and sending QUIC packets for a QUIC flow indicating spin bit values according to various embodiments.

FIG. 6 shows a process flow diagram of a method 600 for generating and sending QUIC packets for a QUIC flow indicating spin bit values. With reference to FIGS. 1A-6, the method 600 may be implemented by a QUIC sender computing device (e.g., 401), a particularly by a processing device (e.g., 212, 216, 252 or 260) within a QUIC computing device (e.g., 120a-120e, 200, 320) of a communication network (e.g., 100).

In block 602, the QUIC sender computing device may set a spin bit value. The spin but may be a bit in a header of a QUIC packet that may have a value of 0 or 1. The QUIC endpoints for a QUIC flow, e.g., the QUIC sender sending the QUIC packets and the QUIC destination maintain spin bit values. The value of the spin bit is toggled (e.g., from 0 to 1 or from 1 to 0) after each round trip on the QUIC flow is confirmed. For example, the spin bit may initially be set to zero.

In block 604, the QUIC sender computing device may generate and send a QUIC packet for the QUIC flow indicating the spin bit value. Each QUIC packet may include an indication of the spin bit value set by the QUIC sender computing device at the time the QUIC packet is generated for transport.

In determination block 606, the QUIC sender computing device may determine whether a packet receipt is acknowledged. A packet receipt may be an acknowledgment message that may indicate that a QUIC packet was received successfully by the QUIC destination. The receipt of an acknowledgment message may indicate a round trip has occurred for the QUIC flow.

In response to determining the packet receipt in not acknowledged (i.e., determination block 606="No"), the QUIC sender computing device may generate and send a next QUIC packet for the QUIC flow indicating the spin bit value in block 604. In this manner, the subsequent QUIC packets may use the same spin bit value, e.g., a spin bit value of 0, until an acknowledgement message associated with the QUIC packet transport is received.

In response to determining the packet receipt is acknowledged (i.e., determination block 606="Yes"), the QUIC sender computing device may change the spin bit value in block 608. In response to receiving the acknowledgement message, the QUIC sender may toggle the spin bit value to a spin bit value of 1 from the spin bit value of 0.

In block 604, the sender computing device may generate and send a next QUIC packet for the QUIC flow indicating the spin bit value. For example, the spin bit value may have been toggled to 1 such that the next QUIC packet for the QUIC flow may be sent with the spin bit value of 1. Similarly, the QUIC sender may toggle the spin bit after each round trip is confirmed. In this manner, any computing device receiving the QUIC flow may observe the toggling of the spin bits of the QUIC packets to determine when round trips are confirmed by the QUIC sender computing device.

The method 600 may be repeated continuously, periodically or episodically as QUIC packets are generated and sent in block 604.

Figure 7:
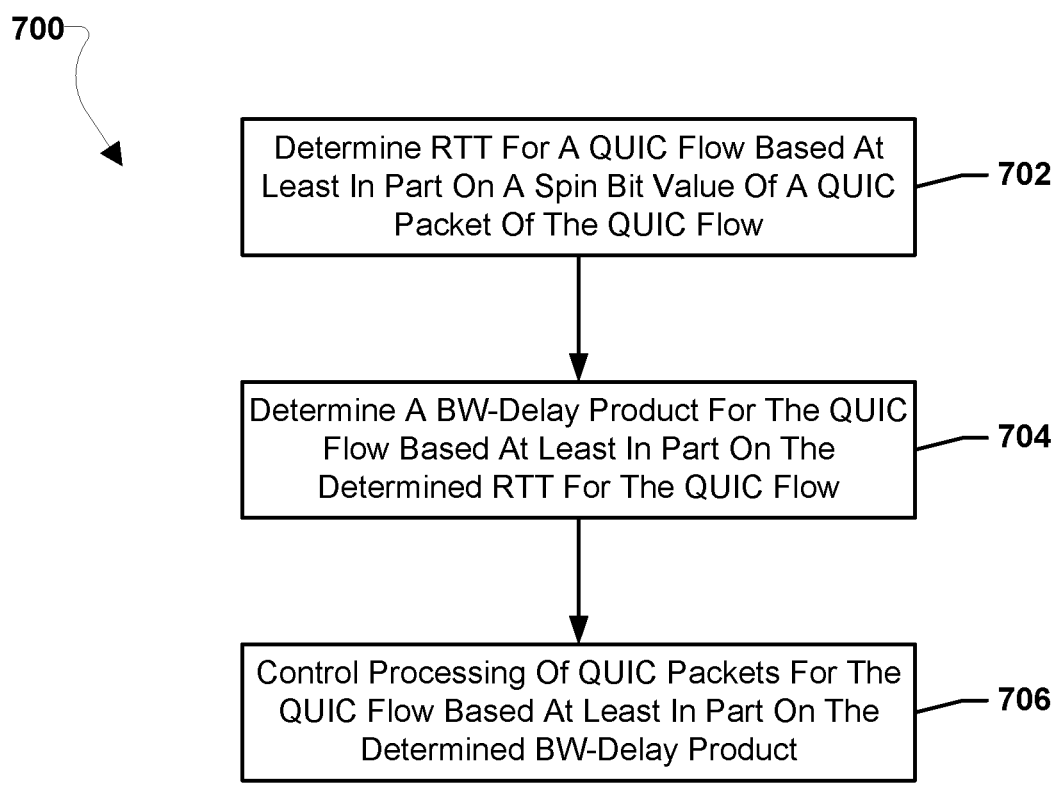
FIG. 7 is a process flow diagram illustrating a method for QUIC packet processing according to some embodiments.

FIG. 7 shows a process flow diagram of a method 700 for determining RTT information based on monitoring spin bits in QUIC packets according to various embodiments. With reference to FIGS. 1A-7, the method 700 may be implemented by a processing device of an apparatus, such as a computing device functioning as a base station 110a-d, 350, a gNB 152, an ng-eNB 154, an ng-eNB 155, an gNB 153, computing devices 150, 151, a router 402, or other computing device within a communication network (e.g., 100).

In block 702, the processing device may determine an RTT for a QUIC flow based at least in part on a spin bit value of a QUIC packet of the QUIC flow. In various embodiments, as the spin bit toggles between 0 and 1 after each round trip is confirmed by the QUIC sender, a measured time between successive spin bit toggles observed on a QUIC flow may be an accurate measurement of RTT for the QUIC flow. In various embodiments, the processing device may monitor the state of the spin bit in the QUIC flow and track the time between state changes of the spin bit. The time between changes of the state of the spin bit may be the measured RTT for the QUIC flow.

In block 704, the processing device may determine a BW-delay product for the QUIC flow based at least in part on the determined RTT for the QUIC flow. In various embodiments, the BW-delay product may be determined by multiplying the bandwidth for the QUIC flow times the determined RTT for the QUIC flow. In some embodiments, the BW-delay product may be determined periodically, episodically, and/or continuously. In some embodiments, the BW-delay product may be averaged, filtered, and/or statistically processed over multiple observed round trips. Averaging, filtering, and/or statistically processing the BW-delay product over multiple observed round trips may avoid the BW-delay product value changing at every round trip. In some embodiments, the BW-delay product may change over the duration of a connection supporting a QUIC flow. In some embodiments, the bandwidth of the QUIC flow may be an over-the-air (OTA) bandwidth, such as an estimate of available OTA bandwidth reported by a RAN, such as NG-RAN, etc. In some embodiments, the bandwidth of the QUIC flow may be derived from QoS parameters for the QUIC flow, such as a GBR bandwidth for the QUIC flow. The GBR bandwidth may be indicated in QoS parameters for the QUIC flow available to the computing device, such as QoS parameters indicated in overhead signaling. In various embodiments, the computing device processing QUIC flows may itself estimate the bandwidth of the QUIC flow. For example, a computing device processing QUIC flows may be a Wi-Fi access point that may estimate the bandwidth of the flow based on reporting from a scheduler, based on modem control signaling, based on past bandwidth estimates, and/or based on combinations thereof.

In block 706, the processing device may control the processing of QUIC packets for the QUIC flow based at least in part on the determined BW-delay product. In various embodiments, a BW-delay product determined using an RTT determined based on a spin bit value of a QUIC packet in a QUIC flow may be used to determine buffer sizing for use in routing the QUIC flow. Controlling the processing of the QUIC packets for the QUIC flow may include setting a buffer size to the BW-delay product. Controlling the processing of the QUIC packets for the QUIC flow may include setting a buffer size such that the total size of all the buffers in the RAN and 5GC network in the QUIC flow path equal the BW-delay product. In some embodiments, a BW-delay product determined using an RTT determined based on a spin bit value of a QUIC packet in a QUIC flow may be used by the processing device to enable early congestion notification. Controlling the processing of the QUIC packets for the QUIC flow may include enabling early congestion notification via sending a congestion notification and/or applying RED procedures to the QUIC flow. In some embodiments, buffer sizing and early congestion notification may be applied in conjunction. In some embodiments, buffer sizing may be implemented with early congestion notification. In some embodiments, early congestion notification may be implemented without early congestion notification.

Figure 8:
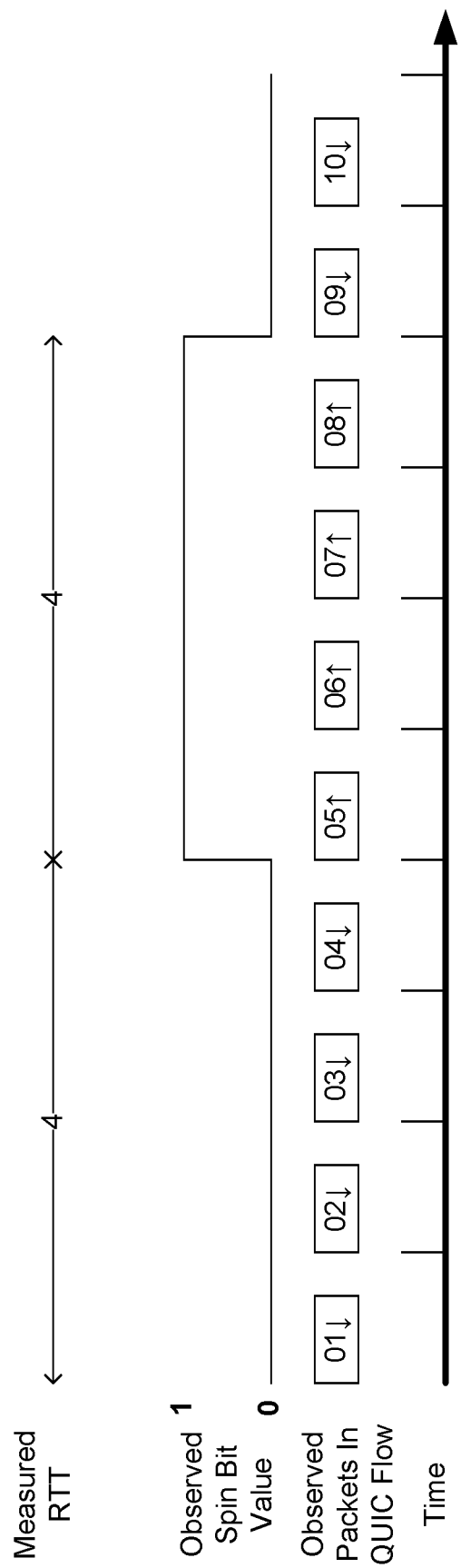
FIG. 8 is a timing diagram relating QUIC packets in a QUIC flow to measured round hip times (RTTs).

FIG. 8 is a timing diagram relating QUIC packets in a QUIC flow to measured RTTs for the QUIC flow. With reference to FIGS. 1A-8, at an initial time the first QUIC packet 01 may be sent for the QUIC flow and observed by the computing device processing QUIC packets for the QUIC flow (e.g., base station 110a-d, 350, gNB 152, ng-eNB 154, ng-eNB 155, gNB 153, computing devices 150, 151, router 402). The observed spin bit value may be 0. The QUIC packets 02, 03, and 04 may subsequently be observed at following times and may also be observed to have spin bit values of 0. The next QUIC packet 05 received may have a toggled spin bit value set to 1. The computing device processing QUIC packets for the QUIC flow (e.g., base station 110a-d, 350, gNB 152, ng-eNB 154, ng-eNB 155, gNB 153, computing devices 150, 151, router 402) may observe the spin bit value change and determine the time from the last spin bit state change (e.g., when the first QUIC packet 01 was received) to be the measured RTT time. Thus, the measured RTT observed may be four time units when QUIC packet 05 is received.

The apparatus or computing device processing QUIC packets for the QUIC flow (e.g., base station 110a-d, 350, gNB 152, ng-eNB 154, ng-eNB 155, gNB 153, computing devices 150, 151, router 402) may continue to determine the RTT by continuing to observe the state of the spin bit in subsequent QUIC packets 06, 07, and 08 of the QUIC flow. The spin bit state may remain at a value of 1 for subsequent QUIC packets 06, 07, and 08 of the QUIC flow. The QUIC packet 09 may have a toggled spin bit value of 0 and the apparatus or computing device processing QUIC packets for the QUIC flow (e.g., base station 110a-d, 350, gNB 152, ng-eNB 154, ng-eNB 155, gNB 153, computing devices 150, 151, router 402) may observe the spin bit value change and determine the time from the last spin bit state change (e.g., when the QUIC packet 05 was received) to be the new measured RTT time. Thus, the measured RTT observed may be four time units when QUIC packet 09 is received. This re-determination of RTT may occur each time the spin bit is observed to have toggled.

Figure 9:
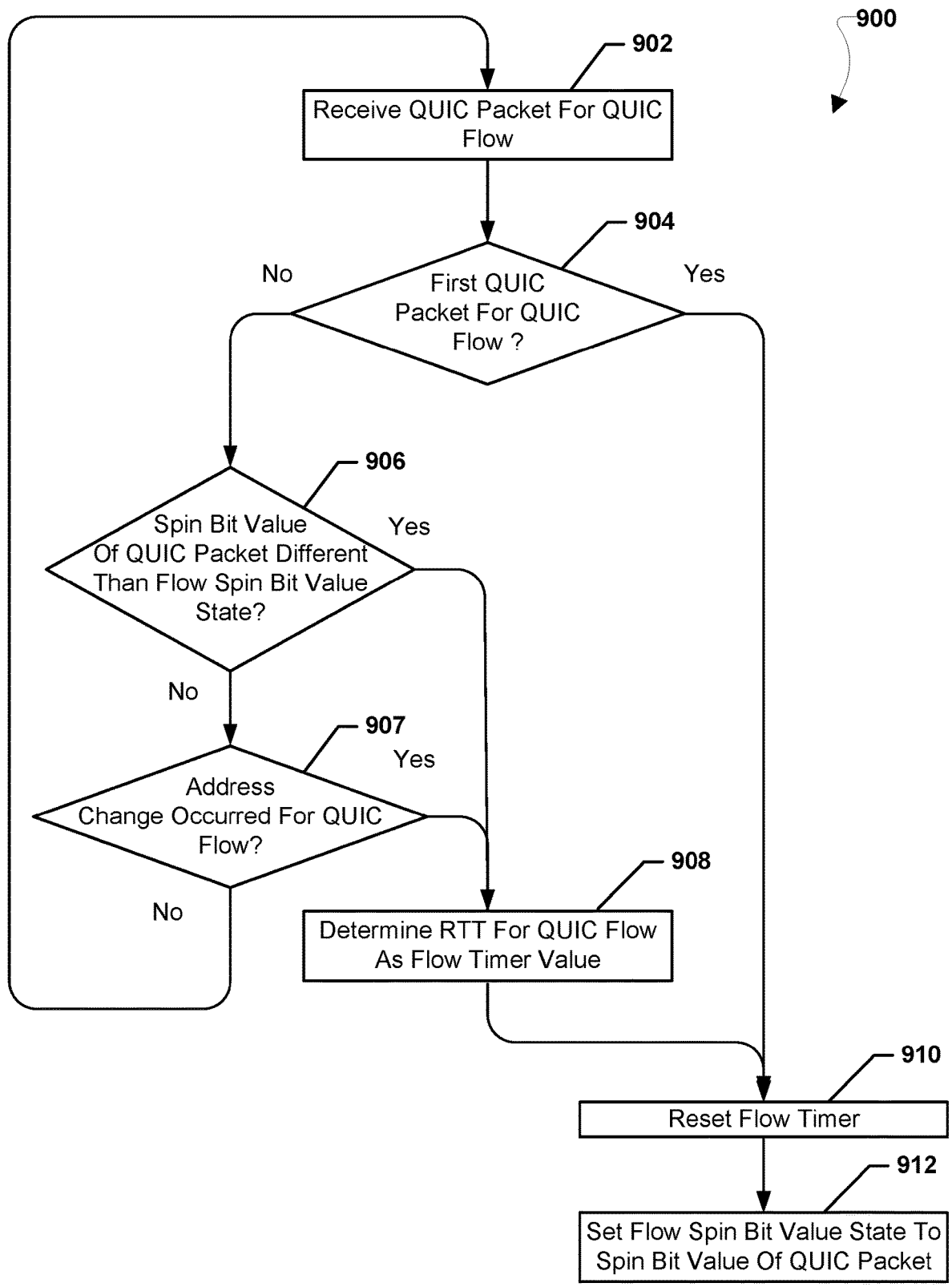
FIG. 9 is a process flow diagram illustrating a method for determining an RTT for a QUIC flow based at least in part on a spin bit value of a QUIC packet of the QUIC flow according to some embodiments.

FIG. 9 shows a process flow diagram of a method 900 for determining an RTT for a QUIC flow based at least in part on a spin bit value of a QUIC packet of the QUIC flow. With reference to FIGS. 1A-9, the method 900 may be implemented by a processing device of an apparatus, such as a computing device functioning as a base station 110a-d, 350, gNB 152, ng-eNB 154, ng-eNB 155, gNB 153, computing devices 150, 151, router 402 or other computing device in a communication network (e.g., 100). In various embodiments, the operations of the method 900 may be performed in conjunction with the operations of the method 700 of FIG. 7. For example, the operations of the method 900 may be performed to determine an RTT for a QUIC flow based at least in part on a spin bit value of a QUIC packet of the QUIC flow in block 702.

In block 902, the processing device may receive a QUIC packet for a QUIC flow.

In determination block 904, the processing device may determine whether the QUIC packet is the first QUIC packet for the QUIC flow.

In response to determining the QUIC packet is the first packet (i.e., determination block 904="Yes"), the processing device may reset the flow timer in block 910. Resetting the flow timer may include starting (or restarting) a count-up timer from (or to) an initial value, such as zero.

In block 912, the processing device may set the flow spin bit value state to the spin bit value of the QUIC packet. For example, when the spin bit value of the QUIC packet is 0, the flow spin bit value state may be set to 0, and when the spin bit value of the QUIC packet is 1, the flow spin bit value state may be set to 1.

The processing device again perform the operations in block 902 to receive a next QUIC packet for a QUIC flow and perform determination block 904 to determine whether the packet is a first packet of a QUIC flow.

In response to determining that the QUIC packet is not the first packet (i.e., determination block 904="No"), the processing device may determine whether the spin bit value of the QUIC packet is different than the flow spin bit state value in determination block 906. The processing device may determine whether the spin bit value of the QUIC packet is different than the flow spin bit state value in various manners, including comparing the spin bit values together to determine whether the values match or not, subtracting the values from one another to determine whether the result is non-zero indicating the values are different, etc.

In response to determining that the spin bit values are the same (i.e., determination block 906=No"), the processing device may determine whether an address change occurred for the QUIC flow in determination block 907. The processing device may determine whether an address change occurred for the QUIC flow by determining whether any IP address (e.g., one or both of the source IP address and destination IP address) for the received QUIC packet is different from any IP address (e.g., one or both of the source IP address and destination IP address) previously associated with the QUIC flow. The change of an IP address may occur when the QUIC endpoint has been migrated. Detecting a change in the IP address may trigger a re-estimation of RTT in some embodiments and may cause the flow timer to reset.

In response to determining no address change has occurred (i.e., determination block 907="No"), the processing device may again perform the operations in block 902 to receive a next QUIC packet for a QUIC flow and perform determination block 904 to determine whether the packet is a first packet of a QUIC flow.

In response to determining that the spin bit values are different (i.e., determination block 910="Yes") or in response to determining that an address change has occurred, the processing device may determine an RTT for the QUIC flow as the flow timer value in block 908.

The processing device may again perform the operations in block 910 to reset the flow timer and block 912 to set the flow spin bit value state to the spin bit value of the QUIC packet.

The processing device may repeat the method 900 continuously, periodically or episodically as QUIC packets are received for routing in block 902.

Figure 10:
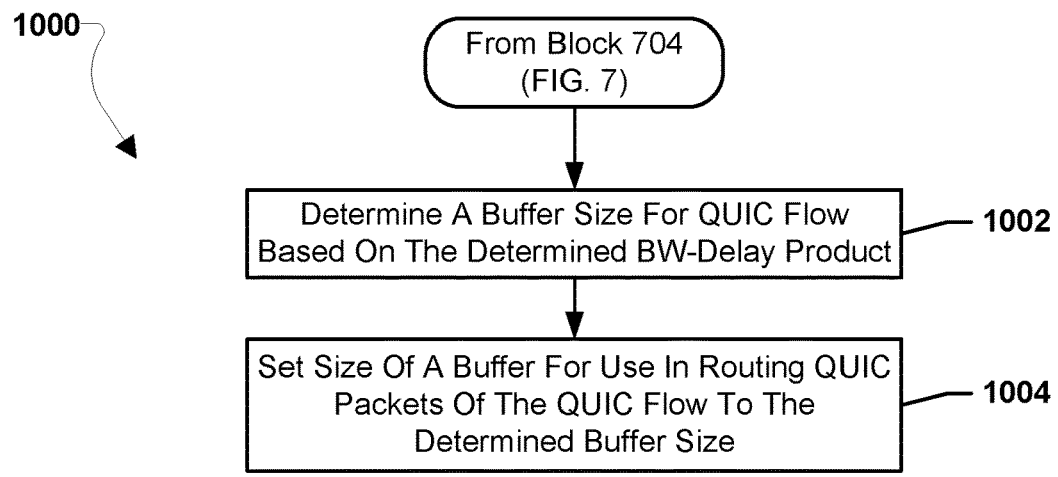
FIG. 10 is a process flow diagram illustrating a method for controlling processing of QUIC packets for a QUIC flow based at least in part on a determined band width-delay (BW-delay) product according to some embodiments.

FIG. 10 shows a process flow diagram of a method 1000 for controlling processing of QUIC packets for a QUIC flow based at least in part on a determined BW-delay product. With reference to FIGS. 1A-10, the method 1000 may be implemented by a processing device of an apparatus, such as a computing device functioning as a base station 110a-d, 350, gNB 152, ng-eNB 154, ng-eNB 155, gNB 153, computing devices 150, 151, router 402 or other communication device in a communication network (e.g., 100). In various embodiments, the operations of the method 1000 may be performed in conjunction with the operations of the method 700 (FIG. 7) and/or the method 900 (FIG. 9). For example, the operations of the method 1000 may be performed by a processing device in response to determining a BW-delay product for the QUIC flow based at least in part on the determined RTT for the QUIC flow in block 704 of the method 700.

In block 1002, the processing device may determine a buffer size for the QUIC flow based on the determined BW-delay product.

In block 1004, the processing device may set a size of a buffer for use in routing QUIC packets of the QUIC flow to the determined buffer size.

Figure 11:
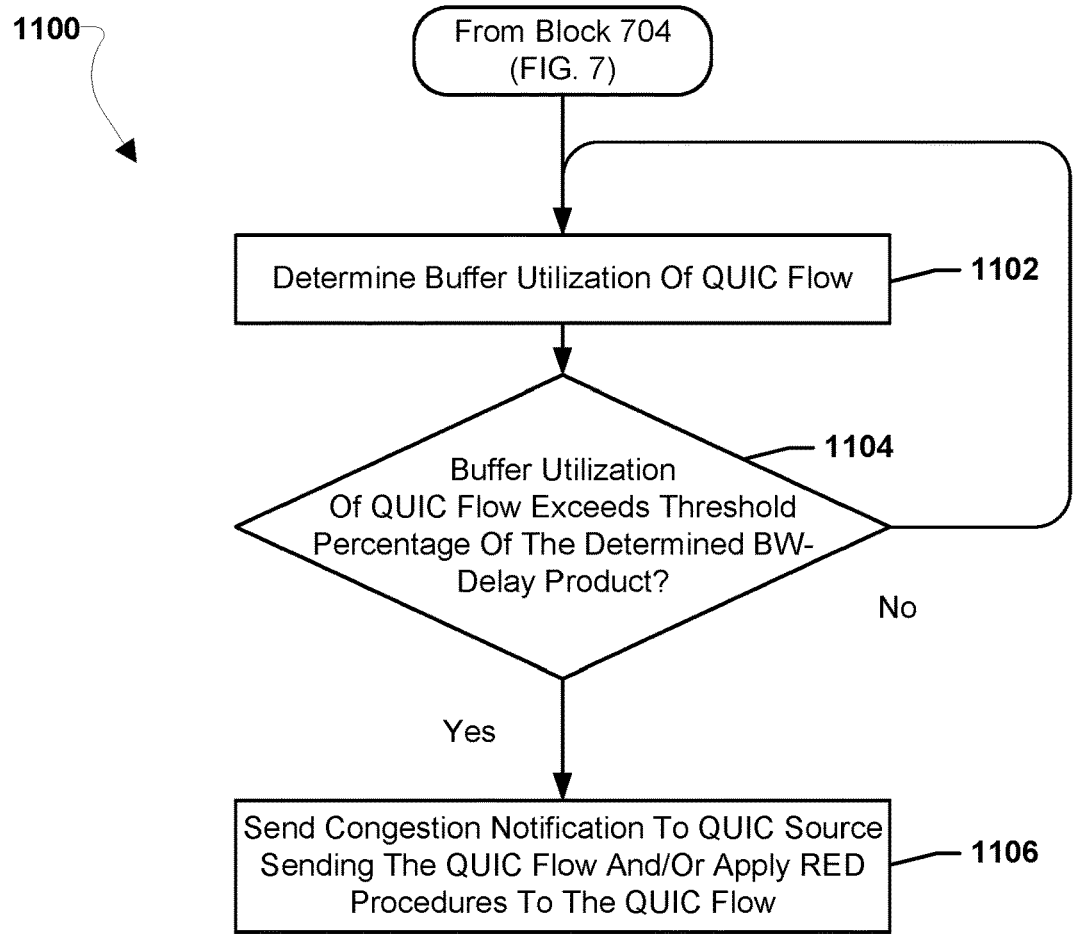
FIG. 11 is a process flow diagram illustrating a method for controlling processing of QUIC packets for a QUIC flow based at least in part on a determined BW-delay product according to some embodiments.

FIG. 11 shows a process flow diagram of a method 1100 for controlling processing of QUIC packets for a QUIC flow based at least in part on a determined BW-delay product. With reference to FIGS. 1A-11, the method 1100 may be implemented by a processing device of an apparatus, such as computing device functioning as a base station 110a-d, 350, gNB 152, ng-eNB 154, ng-eNB 155, gNB 153, computing devices 150, 151, router 402 or other computing device within a communication network (e.g., 100). In various embodiments, the operations of the method 1000 may be performed in conjunction with the operations of the methods 700 (FIG. 7), 900 (FIG. 9), and/or 1000 (FIG. 10). For example, the operations of the method 1000 may be performed in response to determining a BW-delay product for the QUIC flow based at least in part on the determined RTT for the QUIC flow in block 704 of the method 700.

In block 1102, the processing device may determine a buffer utilization of the QUIC flow. Buffer utilization may be a measure of the total size of all QUIC packets in the buffer awaiting transmission toward the QUIC receiver computing device.

In determination block 1104, the processing device may determine whether the buffer utilization of the QUIC flow exceeds a threshold percentage of the determined BW-delay product. The threshold percentage may be setting at the computing device processing QUIC packets selected to avoid buffer overflow. The computing device processing QUIC packets may monitor the state of the buffer utilization to determine whether the buffer utilization exceeds the threshold percentage.

In response to determining that the buffer utilization does not exceed the threshold percentage of the determined BW-delay product (i.e., determination block 1104="No"), the processing device may determine the buffer utilization of the QUIC flow in block 1102. In this manner, buffer utilization may be periodically, continually, and/or episodically monitored.

In response to determining that the buffer utilization exceeds the threshold percentage of the determined BW-delay product (i.e., determination block 1104="Yes"), the processing device may send a congestion notification to the QUIC sender sending the QUIC flow and/or apply RED procedures to the QUIC flow in block 1106. In various embodiments, congestion control may include sending a congestion notification to a QUIC sender to slow down the transmission of QUIC packets on the QUIC flow. For example, a field (e.g., an ECN field) in a packet, such as an IPv4 packet, IPv6 packet, etc., may be set to a value indicating congestion is occurring, and the packet may be sent to the QUIC sender thereby triggering the QUIC sender to reduce the transmission rate of QUIC packets on the QUIC flow. In this manner, the packet including such a field may operate as an explicit congestion notification. In some embodiments, congestion control may include employing RED procedures on the QUIC flow. RED procedures may include dropping random packets or marking packets with ECN fields with a probability of dropping/marking a packet based on the buffer utilization. In some embodiments, both a congestion notification may be sent and RED procedures applied in response to the buffer utilization exceeding the threshold percentage of the determined BW-delay product. In some embodiments, only a congestion notification may be sent or only RED procedures may be applied in response to the buffer utilization exceeding the threshold percentage of the determined BW-delay product.

Figure 12:
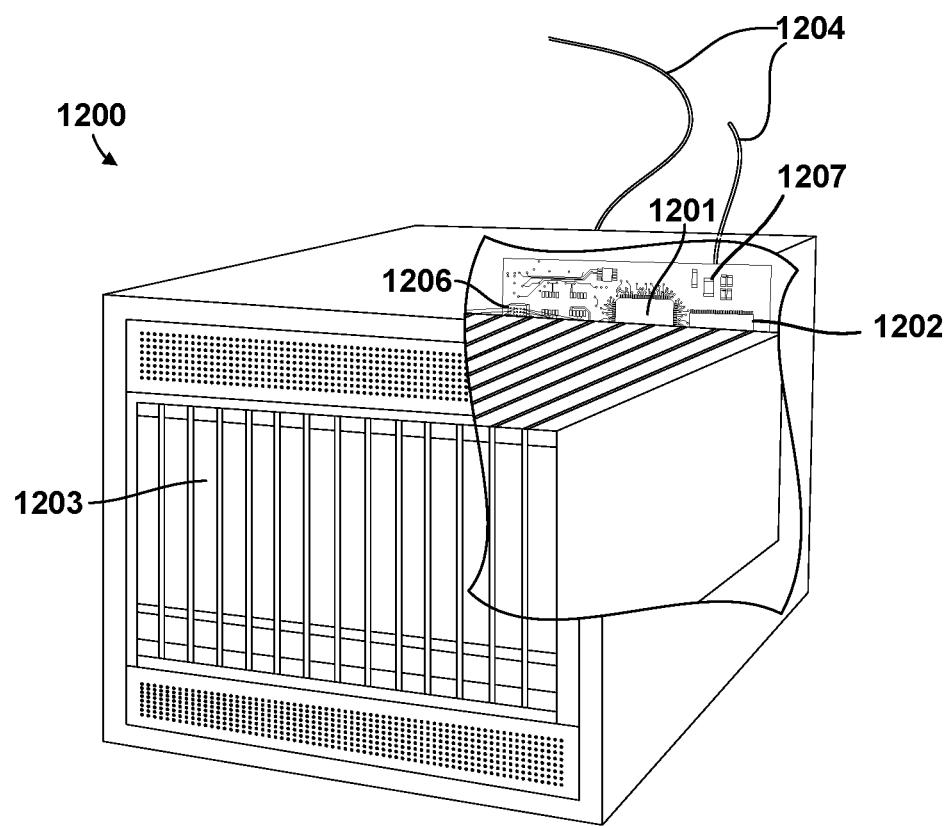
FIG. 12 is a component block diagram of a wireless router device suitable for QUIC packet processing in accordance with various embodiments.

Various embodiments may be implemented on a variety of wireless network devices (e.g., base station 110*a-d*, 350, gNB 152, ng-eNB 154, ng-eNB 155, gNB 153, computing devices 150, 151, or router 402), an example of which is illustrated in FIG. 12 in the form of a computing device 1200 functioning as a network element of a communication network, such as a base station. Such computing devices may include at least the components illustrated in FIG. 12. With reference to FIGS. 1A-12, the computing device 1200 may typically include a processor 1201 coupled to volatile memory 1202 and a large capacity nonvolatile memory, such as a disk drive 1203. The computing device 1200 may also include a peripheral memory access device such as a floppy disc drive, compact disc (CD) or digital video disc (DVD) drive 1206 coupled to the processor 1201. The computing device 1200 may also include network access ports 1204 (or interfaces) coupled to the processor 1201 for establishing data connections with a network, such as the Internet and/or a local area network coupled to other system computers and servers. The computing device 1200 may include one or more antennas 1207 for sending and receiving electromagnetic radiation that may be connected to a wireless communication link. The computing device 1200 may include additional access ports, such as USB, Firewire, Thunderbolt, and the like for coupling to peripherals, external memory, or other devices.

Figure 13:
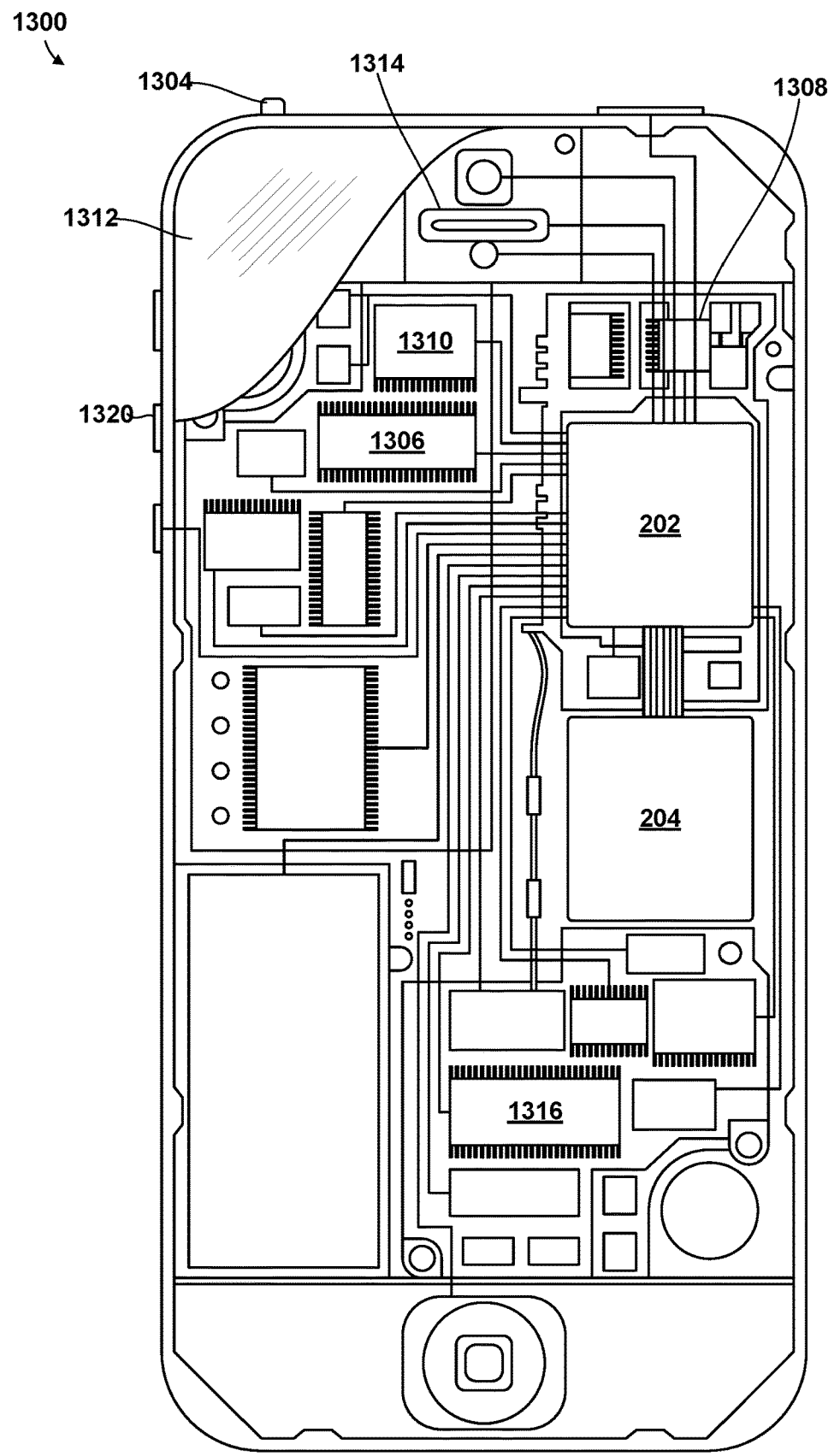
FIG. 13 is a component block diagram of a wireless communication device suitable for QUIC packet processing in accordance with various embodiments.

Another example of a computing device (e.g., the computing device 120*a*-120*e*, 200, 320, 401) suitable for implementing various embodiments is illustrated in FIG. 13 in the form of a smartphone 1300. With reference to FIGS. 1A-13, the smartphone 1300 may include a first SOC 202 (e.g., a SOC-CPU) coupled to a second SOC 204 (e.g., a 5G capable SOC). The first and second SOCs 202, 204 may be coupled to internal memory 1306, 1316, a display 1312, and to a speaker 1314. Additionally, the smartphone 1300 may include an antenna 1304 for sending and receiving electromagnetic radiation that may be connected to a wireless data link and/or cellular telephone transceiver 1308 coupled to one or more processors in the first and/or second SOCs 202, 204. Smartphones 1300 typically also include menu selection buttons or rocker switches 1320 for receiving user inputs.

A typical smartphone 1300 also includes a sound encoding/decoding (CODEC) circuit 1310, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1308 and CODEC 1310 may include a digital signal processor (DSP) circuit (not shown separately).

The processors of the wireless network computing device 1200 and the smart phone 1300 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for Quick UDP Internet Connections (QUIC) protocol packet processing, comprising:
   determining, by a processing device of a computing device in a communication network, whether an address change occurred for a QUIC flow in response to determining that a spin bit value of a QUIC packet of the QUIC flow is different than a flow spin bit value state;

determining, by the processing device, a round trip time (RTT) for the QUIC flow as a flow timer value in response to determining that an address change occurred for the QUIC flow;
determining, by the processing device, a bandwidth-delay (BW-delay) product for the QUIC flow based at least in part on the determined RTT for the QUIC flow and a bandwidth estimate of the QUIC flow; and
controlling, by the processing device, processing of QUIC packets for the QUIC flow based at least in part on the determined BW-delay product.

2. The method of claim 1, wherein controlling processing of QUIC packets for the QUIC flow based at least in part on the determined BW-delay product comprises:
determining, by the processing device, a buffer size for the QUIC flow based on the determined BW-delay product; and
setting, by the processing device, a size of a buffer for use in routing QUIC packets of the QUIC flow to the determined buffer size.

3. The method of claim 1, wherein controlling processing of QUIC packets for the QUIC flow based at least in part on the determined BW-delay product comprises:
determining, by the processing device, whether a buffer utilization of the QUIC flow exceeds a threshold percentage of the determined BW-delay product; and
sending, by the processing device, a congestion notification to a QUIC sender in response to determining that the buffer utilization of the QUIC flow exceeds the threshold percentage of the determined BW-delay product.

4. The method of claim 3, further comprising:
applying, by the processing device, random early detection (RED) procedures to the QUIC flow.

5. The method of claim 1, wherein controlling processing of QUIC packets for the QUIC flow based at least in part on the determined BW-delay product comprises:
determining, by the processing device, whether a buffer utilization of the QUIC flow exceeds a threshold percentage of the determined BW-delay product; and
applying, by the processing device, random early detection (RED) procedures to the QUIC flow in response to determining that the buffer utilization of the QUIC flow exceeds the threshold percentage of the determined BW-delay product.

6. The method of claim 1, wherein:
the computing device is a computing device in a fifth generation (5G) network; and
determining the BW-delay product for the QUIC flow based at least in part on the determined RTT for the QUIC flow and the bandwidth estimate of the QUIC flow comprises determining the BW-delay product for the QUIC flow as a product of an estimate of an over-the-air (OTA) bandwidth for the QUIC flow and the determined RTT for the QUIC flow.

7. The method of claim 1, wherein:
the computing device is a computing device in a fifth generation (5G) network; and
determining the BW-delay product for the QUIC flow based at least in part on the determined RTT for the QUIC flow and the bandwidth estimate of the QUIC flow comprises determining the BW-delay product for the QUIC flow as a product of a bandwidth estimate Quality of Service (QoS) parameter based on a bandwidth estimate for the QUIC flow and the determined RTT for the QUIC flow.

8. The method of claim 7, wherein the bandwidth estimate QoS parameter is a guaranteed bit rate (GBR).

9. The method of claim 1, wherein determining the BW-delay product for the QUIC flow based at least in part on the determined RTT for the QUIC flow and the bandwidth estimate of the QUIC flow comprises determining the BW-delay product for the QUIC flow as a product of a bandwidth estimate for the QUIC flow determined by the computing device and the determined RTT for the QUIC flow.

10. An apparatus, comprising:
a processing device configured with processor-executable instructions to perform Quick UDP Internet Connections (QUIC) protocol packet processing and to:
determine whether an address change occurred for a QUIC flow in response to determining that a spin bit value of a QUIC packet of the QUIC flow is different than a flow spin bit value state
determine a round trip time (RTT) for the QUIC flow as a flow timer value in response to determining that an address change occurred for the QUIC flow;
determine a bandwidth-delay (BW-delay) product for the QUIC flow based at least in part on the determined RTT for the QUIC flow and a bandwidth estimate of the QUIC flow; and
control processing of QUIC packets for the QUIC flow based at least in part on the determined BW-delay product.

11. The apparatus of claim 10, wherein the processing device is further configured with processor-executable instructions to control processing of QUIC packets for the QUIC flow based at least in part on the determined BW-delay product by:
determining a buffer size for the QUIC flow based on the determined BW-delay product; and
setting a size of a buffer for use in routing QUIC packets of the QUIC flow to the determined buffer size.

12. The apparatus of claim 10, wherein the processing device is further configured with processor-executable instructions to control processing of QUIC packets for the QUIC flow based at least in part on the determined BW-delay product by:
determining whether a buffer utilization of the QUIC flow exceeds a threshold percentage of the determined BW-delay product; and
sending a congestion notification to a QUIC sender in response to determining that the buffer utilization of the QUIC flow exceeds the threshold percentage of the determined BW-delay product.

13. The apparatus of claim 12, wherein the processing device is further configured with processor-executable instructions to:
apply random early detection (RED) procedures to the QUIC flow.

14. The apparatus of claim 10, wherein the processing device is further configured with processor-executable instructions to control processing of QUIC packets for the QUIC flow based at least in part on the determined BW-delay product by:
determining whether a buffer utilization of the QUIC flow exceeds a threshold percentage of the determined BW-delay product; and
applying random early detection (RED) procedures to the QUIC flow in response to determining that the buffer utilization of the QUIC flow exceeds the threshold percentage of the determined BW-delay product.

15. The apparatus of claim 10, wherein the processing device is further configured with processor-executable instructions to determine the BW-delay product for the QUIC flow based at least in part on the determined RTT for the QUIC flow and the bandwidth estimate of the QUIC flow by determining the BW-delay product for the QUIC flow as a product of an over-the-air (OTA) bandwidth for the QUIC flow and the determined RTT for the QUIC flow.

16. The apparatus of claim 10, wherein the processing device is further configured with processor-executable instructions to determine the BW-delay product for the QUIC flow based at least in part on the determined RTT for the QUIC flow and the bandwidth estimate of the QUIC flow by determining the BW-delay product for the QUIC flow as a product of a bandwidth estimate Quality of Service (QoS) parameter for the QUIC flow and the determined RTT for the QUIC flow.

17. The apparatus of claim 16, wherein the processing device is further configured with processor-executable instructions such that the bandwidth estimate QoS parameter is a guaranteed bit rate (GBR).

18. The apparatus of claim 10, wherein the processing device is further configured with processor-executable instructions to determine the BW-delay product for the QUIC flow based at least in part on the determined RTT for the QUIC flow and the bandwidth estimate of the QUIC flow by determining the BW-delay product for the QUIC flow as a product of a bandwidth estimate for the QUIC flow determined by the processing device and the determined RTT for the QUIC flow.

19. A non-transitory processor-readable medium having stored thereon processor-executable instructions configured to cause a processing device of a computing device to perform operations for to perform Quick UDP Internet Connections (QUIC) protocol packet processing, the operations comprising:
 determining whether an address change occurred for a QUIC flow in response to determining that a spin bit value of a QUIC packet of the QUIC flow is different than a flow spin bit value state;
 determining a round trip time (RTT) for the QUIC flow as a flow timer value in response to determining that an address change occurred for the QUIC flow;
 determining a bandwidth-delay (BW-delay) product for the QUIC flow based at least in part on the determined RTT for the QUIC flow and a bandwidth estimate of the QUIC flow; and
 controlling processing of QUIC packets for the QUIC flow based at least in part on the determined BW-delay product.

20. The non-transitory processor-readable medium of claim 19, wherein the stored processor-executable instructions are configured to cause the processing device to perform operations such that controlling processing of QUIC packets for the QUIC flow based at least in part on the determined BW-delay product comprises:
 determining a buffer size for the QUIC flow based on the determined BW-delay product; and
 setting a size of a buffer for use in routing QUIC packets of the QUIC flow to the determined buffer size.

21. The non-transitory processor-readable medium of claim 19, wherein the stored processor-executable instructions are configured to cause the processing device to perform operations such that controlling processing of QUIC packets for the QUIC flow based at least in part on the determined BW-delay product comprises:
 determining whether a buffer utilization of the QUIC flow exceeds a threshold percentage of the determined BW-delay product; and
 sending a congestion notification to a QUIC sender in response to determining that the buffer utilization of the QUIC flow exceeds the threshold percentage of the determined BW-delay product.

22. The non-transitory processor-readable medium of claim 21, wherein the processing device is configured with processor-executable instructions to perform operations further comprising:
 applying random early detection (RED) procedures to the QUIC flow.

23. The non-transitory processor-readable medium of claim 19, wherein the stored processor-executable instructions are configured to cause the processing device to perform operations such that controlling processing of QUIC packets for the QUIC flow based at least in part on the determined BW-delay product comprises:
 determining whether a buffer utilization of the QUIC flow exceeds a threshold percentage of the determined BW-delay product; and
 applying random early detection (RED) procedures to the QUIC flow in response to determining that the buffer utilization of the QUIC flow exceeds the threshold percentage of the determined BW-delay product.

24. The non-transitory processor-readable medium of claim 19, wherein the stored processor-executable instructions are configured to cause the processing device to perform operations such that determining the BW-delay product for the QUIC flow based at least in part on the determined RTT for the QUIC flow and the bandwidth estimate of the QUIC flow comprises determining the BW-delay product for the QUIC flow as a product of an over-the-air (OTA) bandwidth for the QUIC flow and the determined RTT for the QUIC flow.

25. The non-transitory processor-readable medium of claim 19, wherein the stored processor-executable instructions are configured to cause the processing device to perform operations such that determining the BW-delay product for the QUIC flow based at least in part on the determined RTT for the QUIC flow and the bandwidth estimate of the QUIC flow comprises determining the BW-delay product for the QUIC flow as a product of a bandwidth estimate Quality of Service (QoS) parameter for the QUIC flow and the determined RTT for the QUIC flow.

26. The non-transitory processor-readable medium of claim 19, wherein the stored processor-executable instructions are configured to cause the processing device to perform operations such that determining the BW-delay product for the QUIC flow based at least in part on the determined RTT for the QUIC flow and the bandwidth estimate of the QUIC flow comprises determining the BW-delay product for the QUIC flow as a product of a bandwidth estimate for the QUIC flow determined by the processing device and the determined RTT for the QUIC flow.

27. An apparatus, comprising:
 means for determining whether an address change occurred for a Quick UDP Internet Connections (QUIC) flow in response to determining that a spin bit value of a QUIC packet of the QUIC flow is different than a flow spin bit value state;
 means for determining a round trip time (RTT) for the QUIC flow as a flow timer value in response to determining that an address change occurred for the QUIC flow;

means for determining a bandwidth-delay (BW-delay) product for the QUIC flow based at least in part on the determined RTT for the QUIC flow and a bandwidth estimate of the QUIC flow; and means for controlling processing of QUIC packets for the QUIC flow based at least in part on the determined BW-delay product.

* * * * *